(12) United States Patent
Kelkar et al.

(10) Patent No.: US 10,445,663 B2
(45) Date of Patent: *Oct. 15, 2019

(54) HUMAN RESOURCE ANALYTICS WITH PROFILE DATA

(75) Inventors: Bhooshan Prafulla Kelkar, Pune (IN); Mahesh Shivram Paradkar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/440,307

(22) Filed: Apr. 5, 2012

(65) Prior Publication Data

US 2013/0006685 A1 Jan. 3, 2013

Related U.S. Application Data

(63) Continuation of application No. 13/173,115, filed on Jun. 30, 2011.

(51) Int. Cl.
 *G06Q 10/00* (2012.01)
(52) U.S. Cl.
 CPC ................... *G06Q 10/00* (2013.01)
(58) Field of Classification Search
 USPC .............................................. 705/7.11–7.42
 See application file for complete search history.

(56) References Cited

U.S. PATENT DOCUMENTS

| | | | |
|---|---|---|---|
| 6,889,196 B1* | 5/2005 | Clark | G06Q 10/0631 705/7.12 |
| 8,374,905 B2 | 2/2013 | Graham et al. | |
| 2002/0042786 A1* | 4/2002 | Scarborough | G06Q 10/063 706/21 |
| 2003/0004967 A1* | 1/2003 | Calderaro | G06Q 10/06 |
| 2004/0122855 A1* | 6/2004 | Ruvolo | G06Q 30/02 |
| 2005/0071217 A1* | 3/2005 | Hoogs et al. | 705/10 |
| 2006/0095420 A1* | 5/2006 | Ikegami et al. | 707/3 |
| 2009/0144070 A1* | 6/2009 | Psota et al. | 705/1 |
| 2010/0153290 A1* | 6/2010 | Duggan | 705/321 |
| 2012/0253858 A1* | 10/2012 | Glissmann | G06F 17/28 705/7.11 |

OTHER PUBLICATIONS http:///humanresources.about.com/od/recruiting/a/recruit_linked.htm, downloaded Jun. 29, 2011, pp. 1-3.
http://www.webpronews.com/linkedin-launches-set-of-hr-tools-2009-02, downloaded Jun. 29, 2011, pp. 1-2.

(Continued)

*Primary Examiner* — Amber A Misiaszek
(74) *Attorney, Agent, or Firm* — Brian J. Colandreo; Jeffrey T. Placker, Esq.; Holland & Knight LLP

(57) ABSTRACT

A method, computer program product, and system for human resource analytics using profile data is described. The method includes receiving historical project data, wherein the historical project data includes at least one profile of at least one historical project team member. Psychometric data associated with the at least one historical project team member is received. Updated historical project data is generated, in which, at least in part, psychometric data associated with the at least one historical project team member is added to the at least one profile included in the historical project data.

5 Claims, 5 Drawing Sheets

(56) References Cited

OTHER PUBLICATIONS http://www.webpronews.com/why-and-how-linkedin-works-for-business-professionals-2008-11, downloaded Jun. 29, 2011, pp. 1-2.
http://www.psychologytoday.com/blog/wired-success/200908/using-social-networking-recruitment-and-training, downloaded Jun. 29, 2011, pp. 1-3.
http://www.hrmreport.com/article/The-Social-Networking-Revolution/, downloaded Jun. 29, 2011, pp. 1-4.
http://www.psychometrics.ppsls.cam.ac.uk/page/263/apprenticeship-ideas.htm, downloaded Jun. 29, 2011, pp. 1.
http://www.scribd.com/doc/15472046/psychometrics-in-Corporate-India, downloaded Jun. 29, 2011, pp. 1-34.
McGrew, Kevin, "CHC theory and the human cognitive abilities project: Standing on the shoulders of the giants of psychometric intelligence research," Elsevier, 2008 (Year: 2008).

* cited by examiner

HUMAN RESOURCE ANALYTICS WITH PROFILE DATA

RELATED APPLICATIONS

The subject application is a continuation application of U.S. patent application with Ser. No. 13/173,115, filed Jun. 30, 2011, the entire content of which is herein being incorporated by reference.

TECHNICAL FIELD

This disclosure relates to human resource analytics, and, more particularly, human resource analytics using profile data.

BACKGROUND

Organizations and individuals often assemble teams of one or more individuals in order to engage in and complete a specific project or task. When assembling these teams, various parameters may be important to the ultimate success of the project or task. For example, the experience or educational qualifications of various team members may be important. Additionally hard constraints such as cost or completion date targets may be important, as may be soft constraints such as the perceived opportunity to generate business from a customer beyond the current project or task (i.e., cross-selling). Moreover, the social and professional dynamics of the interactions between team members may be important to the success of a project or task, from the perspective of both hard and soft constraints.

BRIEF SUMMARY OF THE DISCLOSURE

According to a first aspect of the disclosure, a method may include receiving, via one or more computing devices, historical project data. The historical project data may include at least one profile of at least one historical project team member. The method may further include receiving, via the one or more computing devices, psychometric data associated with the at least one historical project team member. The method may also include generating, via the one or more computing devices, updated historical project data including, at least in part, adding the psychometric data associated with the at least one historical project team member to the at least one profile included in the historical project data.

One or more of the following features may be included. The method may include receiving at least one project requirement for a new project. The method may include determining a set of modified project requirements for the new project based upon, at least in part, comparing the at least one project requirement for the new project with the updated historical project data. The method may include creating at least one data cluster including, at least in part, one or more portions of at least one of the historical project data and the updated historical project data. The psychometric data associated with the at least one historical project team member may be, at least in part, determined from social networking sources. The psychometric data associated with the at least one historical project team member may be, at least in part, determined through sentiment analysis. The method may include determining an optimal project team composition, based upon, at least in part, the modified project requirements.

According to another aspect of the disclosure, a computer program product resides on a computer readable storage medium and has a plurality of instructions stored on it. When executed by a processor, the instructions cause the processor to perform operations including receiving historical project data. The historical project data includes at least one profile of at least one historical project team member. The operations include receiving psychometric data associated with the at least one historical project team member. The operations further include generating updated historical project data including, at least in part, adding psychometric data associated with the at least one historical project team member to the at least one profile included in the historical project data.

One or more of the following features may be included. The operations may include receiving at least one project requirement for a new project. The operations may include determining a set of modified project requirements for the new project based upon, at least in part, comparing the at least one project requirement for the new project with the updated historical project data. The operations may further include creating at least one data cluster including, at least in part, one or more portions of at least one of the historical project data and the updated historical project data. The psychometric data associated with the at least one historical project team member may be, at least in part, determined from social networking sources. The psychometric data associated with the at least one historical project team member may be, at least in part, determined through sentiment analysis. The operations may include determining an optimal project team composition, based upon, at least in part, the modified project requirements.

According to another aspect of the disclosure, a computing system includes at least one processor and at least one memory architecture coupled with the at least one processor. The computing system also includes a first software module executable by the at least one processor and the at least one memory architecture, wherein the first software module is configured to receive historical project data, wherein the historical project data includes at least one profile of at least one historical project team member. Further, the computing system includes a second software module which may be configured to receive psychometric data associated with the at least one historical project team member. The computing system also includes a third software module which may be configured to generate updated historical project data including, at least in part, adding psychometric data associated with the at least one historical project team member to the at least one profile included in the historical project data.

One or more of the following features may be included. The computer system may include a fourth software module executable by the at least one processor and the at least one memory architecture, wherein the fourth software module may be configured to receive at least one project requirement for a new project. A fifth software module may be configured to determine a set of modified project requirements for the new project based upon, at least in part, comparing the at least one project requirement for the new project with the updated historical project data. A sixth software module may be configured to create at least one data cluster including, at least in part, one or more portions of at least one of the historical project data or the updated historical project data. The psychometric data associated with the at least one historical project team member may be, at least in part, determined from social networking sources. The psychometric data associated with the at least one historical project team member may be, at least in part, determined through sentiment analysis.

According to another aspect of the disclosure, a method includes determining, via one or more computing devices, a set of modified project requirements for a new project based upon, at least in part, comparing at least one project requirement for the new project with updated historical project data. The updated historical project data includes, at least in part, psychometric data associated with at least one historical project team member.

One or more of the following features may be included. The updated historical project data may include at least one data cluster. The psychometric data associated with at least one historical project team member may be, at least in part, determined from social networking sources. The psychometric data associated with the at least one historical project team member may be, at least in part, determined through sentiment analysis.

According to another aspect of the disclosure, a computer program product resides on a computer readable storage medium and has a plurality of instructions stored on it. When executed by a processor, the instructions cause the processor to perform operations including determining a set of modified project requirements for a new project based upon, at least in part, comparing at least one project requirement for the new project with updated historical project data. The updated historical project data includes, at least in part, psychometric data associated with at least one historical project team member.

One or more of the following features may be included. The updated historical project data may include at least one data cluster. The psychometric data associated with at least one historical project team member may be, at least in part, determined from social networking sources. The psychometric data associated with the at least one historical project team member may be, at least in part, determined through sentiment analysis.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements

DETAILED DESCRIPTION OF THE PREFERRED EMBODIMENTS

Figure 1:
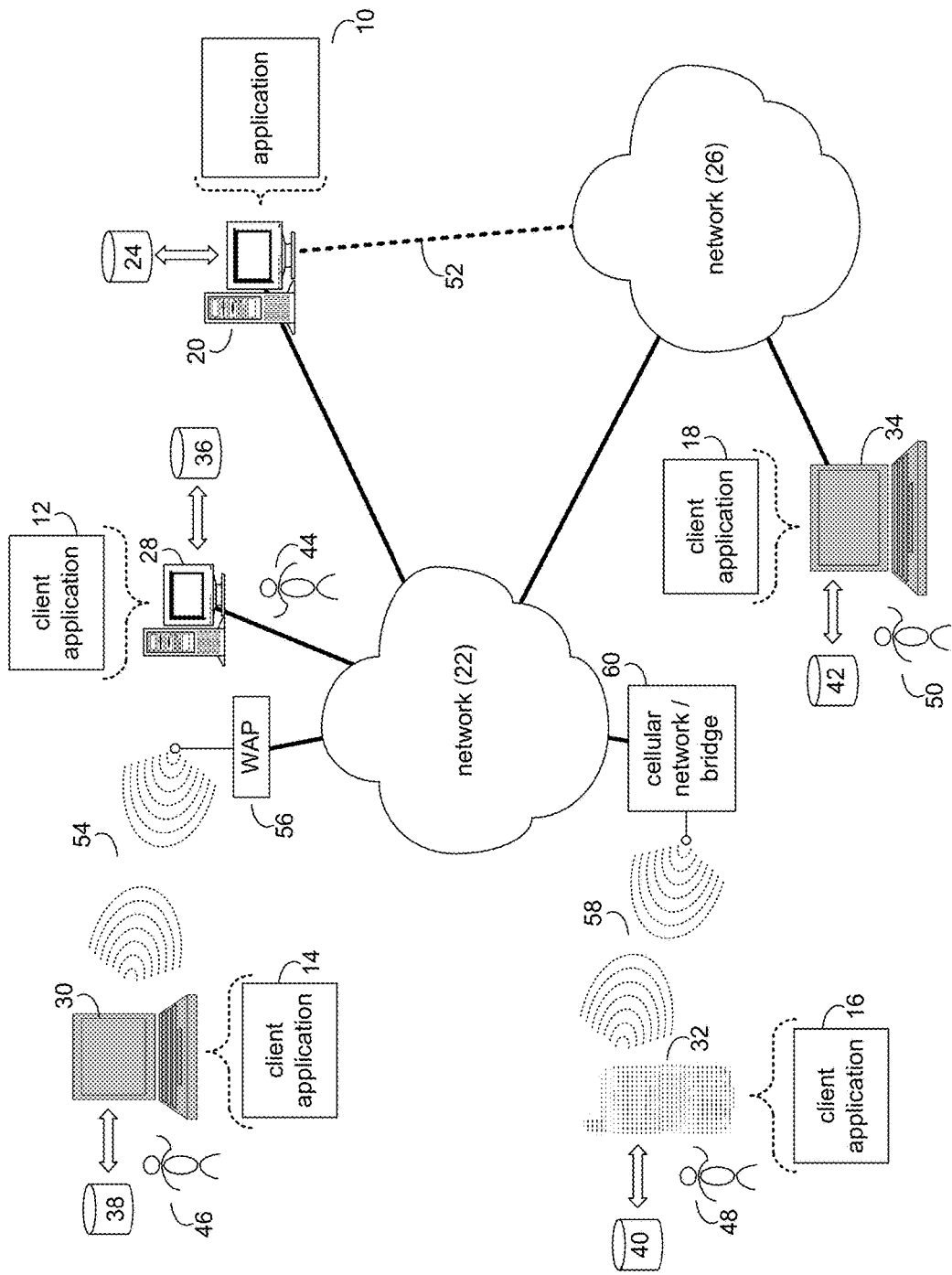
FIG. 1 is a diagrammatic view of a human resource analytic process coupled to a distributed computing network.
Figure 2:
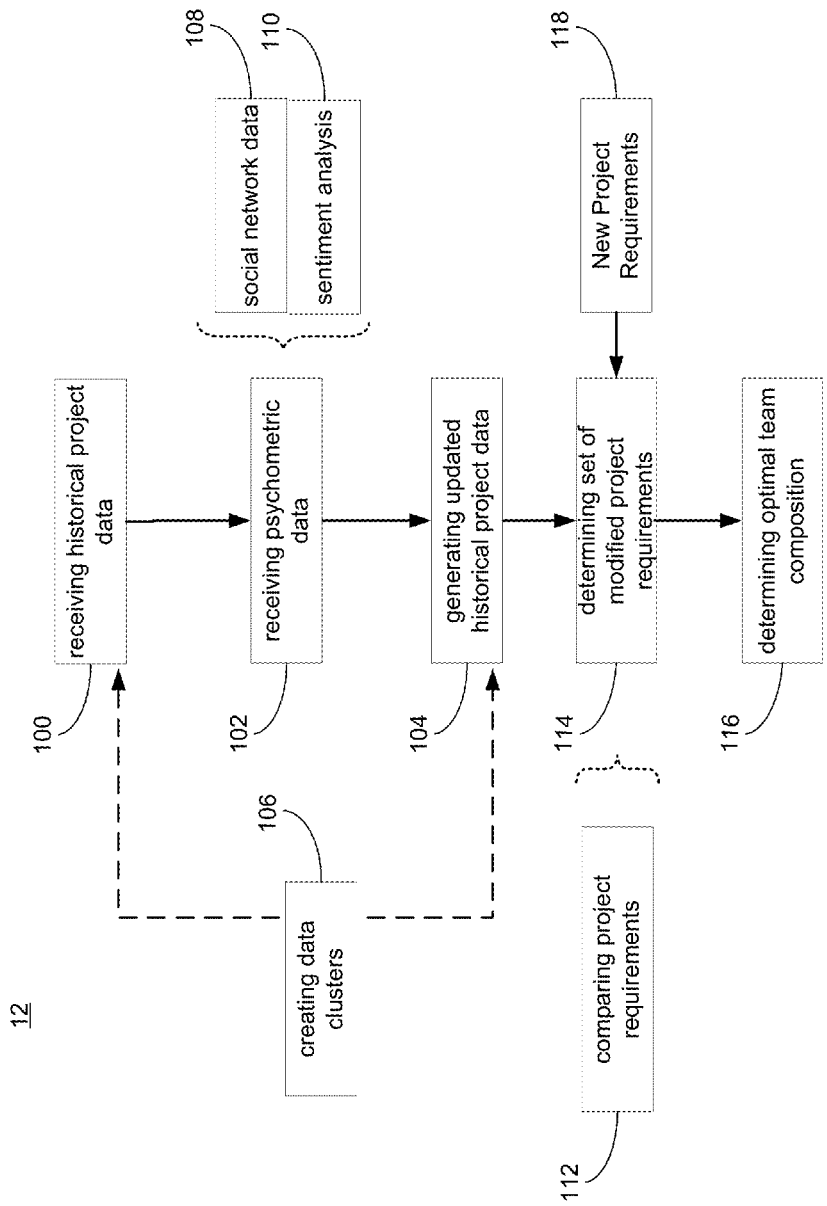
FIG. 2 is a flowchart view of a human resource analytic process.

Referring to FIGS. 1 & 2, there is shown a human resource analytic (HRA) process, for example process 12. As will be discussed further below, process 12 may include receiving 100 historical project data. Process 12 may also include receiving 102 psychometric data. Process 12 may also include generating 104 updated historical project data. Further, process 12 may include receiving at least one project requirement 118. Additionally, process 12 may include determining 114 a set of modified project requirements, including comparing 112 the updated historical project data and the new project requirement. Process 12 may also include determining 116 an optimal team composition.

A HRA process may be a server-side process (e.g., server-side process 10), a client-side process (e.g., client-side process 12, client-side process 14, client-side process 16, or client-side process 18), or a hybrid server-side/client-side process (e.g., the combination of server-side process 10 and one or more of client-side processes 12, 14, 16, 18).

Server-side process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

One or more of client-side processes 12, 14, 16, 18 and server-side process 10 may interface with each other (via network 22 and/or network 26).

Users 44, 46, 48, 50 may access server-side process 10 directly through the device on which the client-side process (e.g., client-side processes 12, 14, 16, 18) is executed, namely client electronic devices 28, 30, 32, 34, for example. Users 44, 46, 48, 50 may access server-side process 10 directly through network 22 and/or through secondary network 26. Further, server computer 20 (i.e., the computer that executes server-side process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

A Human Resource Analytic (HRA) Process

Often when an individual or organization undertakes a new project, various parameters may constrain the composition of the team or teams that will be assigned to the new project. These parameters may relate to various aspects of a project, including, for example, cost and date completion targets and constraints on the desired optimal team composition, and may include, for example, both hard parameters and soft parameters.

Hard parameters may include, for example, project timelines, the target completion date or the target completion cost. Hard parameters may also include, for example, the particular outcome desired for a project (e.g., the specific accomplishments or finished products that will indicate successful completion the project). Additionally, hard parameters may include restrictions on the members that will comprise the team. For example, for a particular project hard constraints may include the requirement that a team member have a particular educational degree (e.g., a Ph.D. in nuclear engineering), a particular certification (e.g., a professional engineer's certificate), or a particular licensure (e.g., admission as an attorney to the bar of a particular state). Other example of hard parameter restrictions on team members may include, but are not limited to, geographical location (e.g., only team members located in Malaysia), or years of experience (e.g., at least one team member must have 30 years of experience at the company or 15 years of experience with a particular type of project). Hard parameter restrictions on team members may relate to particular team members (as in some of the examples above) or may relate to a portion of a team including multiple team members, or may relate to a team as a whole: for example, one hard constraint might require that the sum of personal experience with a typical project exceed a certain number of years (e.g., a team is required to have, in total, 50 years of experience laying under-sea cable, although no individual team member is required to have that many years of experience individually).

Soft parameters, like hard parameters, may relate to particular aspects of a project or to a project as a whole. For example, soft parameters may include factors relating to client satisfaction with the project or to development of additional business, such as the perceived opportunity to cross-sell additional products or services to the client for whom a project is being undertaken. Additionally, soft parameters may relate specifically to individual team members, to groups of team members. For example, soft parameters might relate to the personality of a team member, to a team member's business acumen or ability to develop business beyond a currently assigned project, or to a team member's ability to work with and/or direct other team members. One specific example of soft parameters includes data that may be gleaned from psychometric data.

Psychometric data may relate to mental abilities and psychological characteristics and may result from psychometric analysis (sometimes also referred to as psychological or occupational analysis or testing). In some instances, psychometric analysis may be designed to test an individual's mental abilities and psychological characteristics in a controlled setting and on a scientifically quantifiable basis. It may be based on statistical studies or other bodies of evidence and may address diverse areas of psychological characteristics and mental abilities, including general intelligence, social intelligence, and personality traits.

Psychometric analysis tests and procedures may be accredited by professional psychological organizations or by other bodies and are often designed to assist businesses with recruiting and general human resource analysis. Psychometric data may include various types of data from psychometric analysis, including, but not limited to, for example, data relating to a personality type or personality trait of an individual. Psychometric data may also include, but is not limited to, information relating to the social, intellectual or professional inclinations or tendencies of an individual.

One common type of psychometric test is the Myers-Briggs Type Indicator personality inventory (MBTI), which is based on the identification of 16 distinctive personality types. Using questions relating to preferences (e.g., "Do you usually prefer A or B?") the MBTI analysis may categorize individuals as belonging to one category from each of the following pairs: Extraverted ("E") or Introverted ("I"); Sensing ("S") or Intuitive ("N"); Thinking ("T") or Feeling ("F"); Judging ("J") or Perceiving ("P"). Accordingly, any given individual completing an MBTI evaluation may be categorized according to one of the 16 possible combinations of the elements of these pairs. For example, one individual may be classified as INTP (Introverted, Intuitive, Thinking, Perceiving) which may indicate, respectively, a general preference to focus on the inner world, to add interpretation or meaning to basic information she receives, to make decisions based on logic and consistency, and to remain open to new information and options. Another individual, for example, may be classified as ESFJ (Extroverted, Sensing, Feeling, Judging), which may indicate, respectively, a general preference to focus on the outer world, to focus on basic information without adding interpretation or meaning, to consider people and other special circumstances before making decisions, and to make final decisions relating to the outside world rather than staying open to new information and options. MBTI analysis may not be a ranking analysis (e.g., no categorization is a "better" or "preferable" categorization), but rather may be intended to aid in the understanding of individuals' preferences when they are confronted with questions, tasks, problems, and other scenarios.

Another type of psychometric test is the Hermann Brain Dominance Instrument (HBDI) analysis. The HBDI model may divide thinking into four different modes: analytical thinking (e.g., collecting data, logical reasoning, etc.); sequential thinking (e.g., following directions, organization, etc.); interpersonal thinking (e.g., listening to and expressing ideas, group interaction, etc.); and imaginative thinking (e.g., taking initiative, creative problem solving, etc.). HBDI testing may aim to identify personal preferences or inclinations toward a particular mode of thinking, often in order to determine a dominant preference as well as a generalized ranking (e.g., one individual's thinking may be dominantly interpersonal, with some inclination toward sequential and imaginative thinking, and weaker inclination toward analytical thinking).

Another type of psychometric test is the Profile XT assessment. This may be an assessment of job-related qualities including thinking and reasoning style, behavioral traits, and occupational interests. Profile XT assessment may sometimes be described as "total person concept" analysis and may include assessment of verbal and numerical reasoning, behavioral traits and work interests, as well as job-fit analysis that may be intended to match a particular individual with a particular job or task.

Another type of psychometric test is the Thomas Personal Profile Analysis (Thomas PPA). Like the HBDI model, Thomas PPA may endeavor to assess individuals based on four characteristics, although the characteristics used by Thomas PPA (e.g., dominance, inducement, submission and compliance) may differ from those used in the HBDI model. Thomas PPA may recognize that different individuals may express each of these characteristics more or less strongly at any particular time, and that individuals may tend, generally, to more strongly display certain of these characteristics than others. Thomas PPA tests may utilize tetrads of descriptive words, from which test takers are prompted to chose the word which they feel best describes their personality. The answers may then be analyzed to determine which of the four Thomas PPA characteristics a particular individual may most strongly exhibit.

The psychometric tests described above (e.g., HBDI, Profile XT, MBTI, Thomas PPA) and other psychometric tests are sometimes referred to as "individual" profile tests, because they are typically completed by an individual herself "Individual" profile tests may often not provide a complete picture of an individual's true psychometric profile (e.g., may not result in complete or completely accurate psychometric data). This may be because, for example, individuals may fail to assess their own personality with objectivity and honesty. Self-analysis may be difficult for some individuals, which may be further compounded by the anxiety of being "tested" or "analyzed." Further, when psychometric tests are administered in an employment context, individuals may adjust (consciously or sub-consciously) their answers in order to more closely approximate what they believe may be the "right" answer, from the perspective of the test administrator. In many psychometric tests this focus on the "right" answer may skew the results away from accuracy.

Accordingly, it may sometimes be useful to employ tests that are partially or entirely feedback-based. "Feedback-based" profiling, may avoid the potential self-assessment bias of "individual" profile test. "Feedback-based" types of test may utilize input from individuals other than the individual being analyzed in order to construct a more accurate and complete psychometric profile (e.g., to determine a more complete and accurate set of psychometric data). For example, Belbin 360 analysis may be used to create a Belbin Self-Perception Profile (SPI) through the combination of self-reporting and observer assessments. The observer assessment process may include soliciting managers, colleagues and subordinates of an individual to complete a short assessment of that individual, which may include various types of psychometric data.

Although various types of psychometric analysis tests have been described above, it will be understood that psychometric analysis may include the collection of psychometric data through types of analysis not included in the lists above. The analysis may sometimes be administered by certified or trained professionals or by non-expert persons, or may sometimes be self-administered through a variety of means, including administration over the world wide web or through other media. Psychometric analysis may focus on purely psychological traits, as in, for example, MBTI analysis, on behavioral traits, as in, for example, Belbin SPI, or a combination of the two.

For the following discussion, client-side HRA process 12 will be described for illustrative purposes. It should be noted that client-side process 12 may be incorporated into server-side process 10 and may be executed within one or more applications that allow for communication with client-side process 12. However, this is not intended to be a limitation of this disclosure, as other configurations are possible (e.g., stand-alone client-side processes and/or stand-alone server-side processes.) For example, some implementations may include one or more of client-side processes 14, 16, 18 in place of or in addition to client-side process 12.

Figure 3:
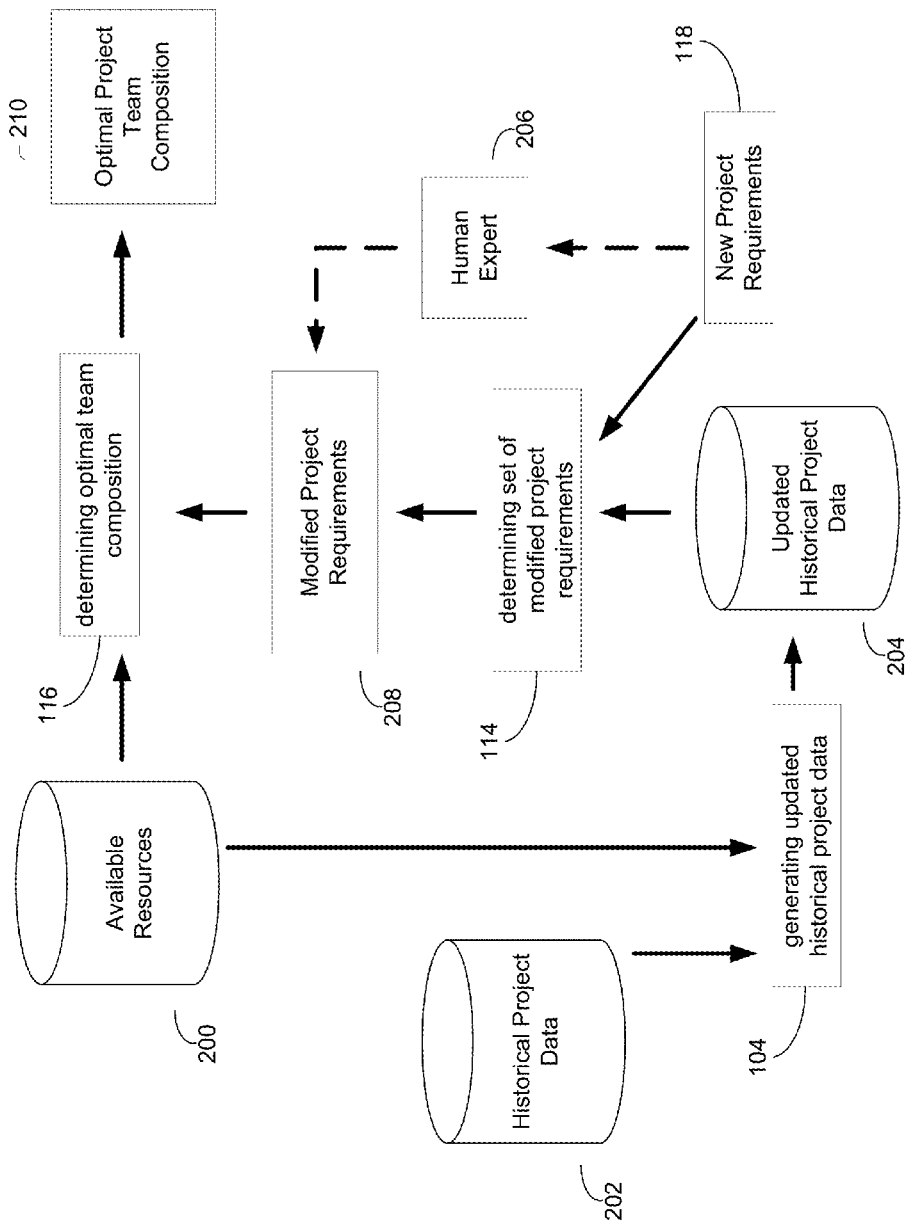
FIG. 3 is a diagrammatic view of a human resource analytic process.

Process 12 may include receiving 100, via one or more computing devices, historical project data. Often an organization or an individual will retain data relating to projects that have been undertaken in the past. For example, an organization may retain information regarding project hard parameters (e.g., team composition, project timelines, the target and actual completion dates or the target and actual completion cost of the project), and project soft parameters (e.g., whether cross-selling opportunities were realized or whether the client was satisfied). This historical project data may be stored in a variety of ways, including, for example, referring now to FIG. 3, in database 202, which may be stored, for example, on storage device 36 or on another storage device (e.g., storage device 24). The historical project data may include at least at least one profile of at least one historical project team member. For example, if Project X was undertaken by a team consisting of historical project team members Adams, Bates, Charles, and Danbury, profile information related to at least one of those four team members may be included in the historical project data. For example, the historical project data may include a list a of the four team members as well as the profile information that Adams has a Master's Degree in Computer Science, that Bates has 6 years of experience in the company, and that Charles has worked on 12 successful software architecture projects. Profile information may further include, for example, various other human resources information, including, but not limited to, age, position in the company, salary, and employment and educational history.

Process 12 may further include receiving, via the one or more computing devices, psychometric data associated with the at least one historical project team member. For example, if MBTI-type data were used by the organization, process 12 may include receiving the information that Adams has been classified as an INTP personality type, while Charles has been classified as an ESFJ personality type. This information may be directly relevant to various aspects of a historical (or future) project. For example, considering again MBTI-type psychometric data, it may be found that various project parameters may be satisfied or not satisfied depending on the psychometric profiles or combination of psychometric profiles present on a given team. For example, a team with no individual exhibiting an Extroverted-type personality may be found to rarely complete successful cross-selling of additional products or services because no team member is particularly comfortable engaging in sales activity. Or a team with no Feeling-type personality may be found to exhibit poor team dynamics due to the absence of an individual who can skillfully balance complicated interpersonal relationship factors. Further, particular combinations of MBTI-type (or types based other psychometric analyses) may be found to result in favorable hard parameter results—e.g., on-time and under-budget completion of particular types of projects—while other combinations may result in less favorable outcomes.

Psychometric data may be received from a variety of sources. For example, an organization may maintain database 200 of available resources (e.g., individuals or teams of individuals), which may include profiles of individuals who have worked on historical projects as well as profiles of individuals who have not participated in historical projects but are currently available to participate new projects. The profiles included in database 200 may include psychometric data associated with the these individuals, including psychometric data associated with the individuals who have worked on historical projects as well as psychometric data associated with individuals who are available for future projects but may not have worked on a historical project. It will be understood that database 200 may be stored, for example, on storage device 36 or on another storage device (e.g., storage device 24).

Process 12 may further include generating 104, via the one or more computing devices, updated historical project data. Generating updated historical project data may include, for example, adding the psychometric data associated with one or more historical project team member (e.g., psychometric data stored in the profiles of database 200) to the one or more profiles included in the historical project data. For example, an organization may maintain database 200 of available resources and database 202 of historical project data, in which case generating 104 updated historical project data may include receiving psychometric data from database 200 and supplementing the profiles of team members in the database 202 with that psychometric data. Psychometric data from one individual's profile included in, for example, database 200 may be added to the same individual's profile included in, for example, database 202.

Figure 4:
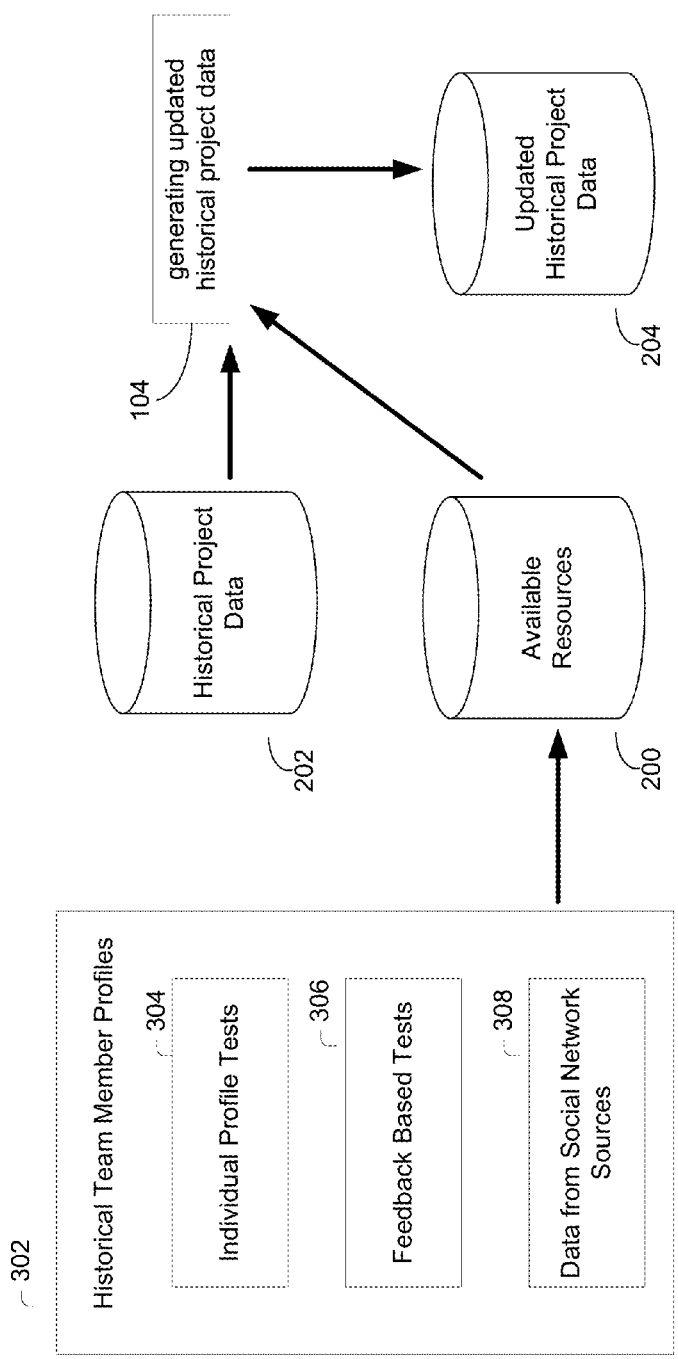
FIG. 4 is a diagrammatic view of a portion of a human resource analytic process.

As a further example, referring now also to FIG. 4, profiles 302 of one or more historical team members (e.g., the profiles of Adams and Charles), which may be stored in database 200, may include various types of psychometric data. For example, profiles 302 may include results from sources including, but not limited to, individual profile tests 304 (e.g., MBTI test results), feedback based tests 306 (e.g., Belkin 360 analysis results), and psychometric data determined from social network sources 308. Historical project data, which may be stored in database 202, may include hard and soft parameters relating to a particular project (e.g., Project X) including profiles of one or more of the same historical team members (e.g., the profiles of Adams and Charles). These profiles, because they are part of the historical project data that has not yet been updated, may include various types of profile information (e.g., years of experience, qualifications, job title, etc.) but may not include psychometric data. Updated historical project data, which may be stored in database 204, may include these same profiles of historical team members, as well as psychometric data (e.g., psychometric data from profiles 302) in addition to hard and soft parameters associated with various historical projects. It will be understood that various databases in the FIGS. 3-5 (e.g., database 204 and database 202) may be stored in the same storage device (e.g., storage device 36), or on two or more separate storage devices (e.g., storage devices 36 and 24).

Process 12 may further include receiving new project requirements 118. As an example, new project requirements 118 may include one or more hard parameters for a new project such as target completion data, target budget, and necessary professional or experience qualifications for one or more team members. New project requirements 118 may also include, for example, one or more soft parameters for a new project, such as whether there may exist opportunities to cross-sell or otherwise derive future business from the client associated with the new project. For example, new Project Y may include new project requirements 118 including, but not limited to, a team including at least two individuals with Ph.D.s in astrophysics, a target completion date of Mar. 31, 2015, a target budget of $12.3 Million, that the client may be amenable to cross-selling, and that the finished product must be aesthetically pleasing.

Process 12 may further include determining 114 a set of modified project requirements 208 for the new project. Determining 114 set of modified project requirements 208 may be based upon, at least in part, comparing 112 new project requirements 118 with the updated historical project data of database 204. For example, new project requirements 118 may include various hard and soft parameters that are similar to the hard and soft parameters of one or more projects included in the updated historical project data. Comparison of new project requirements 118 with the updated historical project data may reveal these similarities. Further, the updated historical project data may include the success of a historical project (e.g., whether the project was complete on time and under budget, and whether, for example, cross-selling opportunities were realized) as well as psychometric data relating to various historical project team members. Accordingly, modified project requirements 208 may be determined, based, for example, upon the comparison of new project requirements 118 and the updated historical project data, to include the original hard and soft parameters of new project requirements 118 as well as a desired team composition based on psychometric data included in the updated historical project data. New project requirements 118 may be expressed as a vector including this information, for easy operation within a computational architecture.

As an example, data related to historical Project X may be included in the updated historical project data and may include various hard and soft parameters including, but not limited to a team including at least two individuals with Ph.D.s in chemistry, a target completion date of Dec. 1, 2004, a target budget of $26 Million, that the client may be amenable to cross-selling, and that the finished product must be aesthetically pleasing. Further, the updated historical project data related to historical Project X may include the information that the team contained two Ph.D.s with MBTI type ENFJ personalities and that Project X was completed on time, under budget, with an aesthetically pleasing result and with successful cross-selling. Comparing 112 the new project requirements 118 of Project Y with the updated historical project data may reveal that Project X and Project Y both included the hard and soft parameters of a team including at least two individuals with Ph.D.s in a technical field, a target budget of several million dollars, the requirement of aesthetically pleasing results, and the opportunity to cross-sell. Further, a second historical project, Project Z, may include similar hard and soft parameters, but instead include a team with two individuals with Ph.D.s in a technical field having MBTI type INFJ personalities. Project Z, for example, may have been completed on time and under budget, but without an aesthetically pleasing result and without successful cross-selling. Accordingly, modified project requirements 208 associated with new Project Y may include a preference to include two individuals with Ph.D.s with MBTI type ENFJ personalities, and a preference not to include two individuals with Ph.D.s with MBTI type INFJ personalities.

As a further example, if a certain type historical project with similar hard and soft parameters to those included in new project requirements 118 is found to have been most successful when the historical project team included at least one team member of MBTI type ISFP (Introverted, Sensing, Feeling, Perceiving) and at least one team member of MBTI type ENFP (Extroverted, Intuitive, Feeling, Perceiving), modified project requirement 208 may include a preference for a team including at least one team member of MBTI type ENFP and ISFP. Similarly, if the same type of historical project is found to have been less successful when the historical project team included more than two team members of MBTI type EITJ (Extroverted, Intuitive, Thinking, Judging), modified project requirement 208 may include a preference for a team not including more than two team members of MBTI type EITJ.

Process 12 may further include creating 106 at least one data cluster including, at least in part, one or more portions of at least one of the historical project data and the updated historical project data. The technique of creating data clusters is well known in the art and may generally include assigning portions of data within a larger set into subsets ("clusters") based on certain similarities between the elements of each particular subset. Creating 106 at least one data cluster may result in comparing 112 new project requirements 118 with historical project data proceeding more simply or with greater speed, as it may not be necessary to compare 112 new project requirements 118 with every historical project, but only with the cluster or clusters of historical projects that most closely resemble new project requirements 118. It will be understood that a variety of factors may be employed in order to determine the content of clusters. For example, one cluster of updated historical project data may include projects requiring a team consisting only of highly educated technical workers. As another example, another cluster of updated historical project data may include projects requiring capital expenditure of more than $100 Million.

Creating 106 at least one data cluster may be performed with respect to historical project data, updated historical project data, or both, and may be achieved through the use of various artificial intelligence techniques, as well as, for example, through an expert system approach. An expert system approach may generally includes the use of a knowledge base of human expertise for software-implemented problem solving, sometimes including a series of if-then analysis statements, rooted in human-developed expertise, and often coupled with certainty parameters (e.g., if a project included a drilling expert, then it relates to subterranean operations (certainty 75%)).

The psychometric data associated with historical project members, e.g., the psychometric data included in historical team member profiles 302, may also include psychometric data that has been determined from social networking sources.

Social networking sources (sometimes also referred to as "social media" sources or "Web 2.0" sources) include a variety of sources, which are generally characterized by the ability of individuals or groups to participate socially in a network-based forum. In some instances, social networking sources may be the primary focus of a product or application. For example, the social networking website www.facebook.com allows users to create personal profiles, to select groups of individuals with which to more closely associate themselves, and to share comments, status, location, thoughts, photos, videos, website links and a variety of other content in a personalized manner. As another example, the website www.linkedin.com allows users to create a personal profile in order to connect to and interact with various professional contacts and networks, often with the purpose of exploring career opportunities or developing business contacts.

As a further example, individuals often create online records of their activities, thoughts or interests, or of particular subject matter that is of interest to them (these online records are sometimes referred to as web-logs or "blogs"). Through blogs, individuals (known as "bloggers") can share original, derived or otherwise obtained content. This sharing may include any individual with a standard internet connection (e.g., open blogs) or may include only a specified group of individuals (e.g., blogs with restricted membership or restricted access).

In other instances, social networks may operate as a peripheral or secondary function of a product or application. For example, many websites devoted to providing news or entertainment content may allow their users to comment or otherwise respond to various news stories or other content. Often the overall length of the comment sections of these websites may exceed the overall length of the original website content, indicating a rich and extensive social interaction among participants. Similarly, retail sites may allow users to post reviews and other useful information on product webpages.

Additionally, certain platforms may provide for social interaction among users divorced from any formalized content. For example, the service Twitter allows users to update a feed of comments from a variety of sources (e.g., from mobile telephones) while simultaneously delivering the feed to any other user who requests it. In this way, as with certain other types of social media, information may be shared by a single user with a multitude of others. By contrast, certain social networking platforms may provide for online social interaction but in a more prescribed manner and only with a select group of individuals (e.g., instant messaging services, in which users can communicate in a real-time manner over a network, but only with a selected group of individuals).

The examples above are merely a sample of many different types of social networking sources. Further, although these examples are discussed in an isolated context, it will be understood that various types of social networking sources may sometimes be combined. For example, it may be possible for a news-content website to allow automated connection of particular story with a user's Facebook page (e.g., through the use of a "Like" button). As another example, a Twitter user may include information linking to text, video, audio or other content in its submissions to the Twitter service, which other Twitter users may then view and respond to. As another example, within a particular blog a blogger may link to or embed content relating to, for example, an entertainment story, while simultaneously allowing the readers of the blog to comment and discuss the content within the confines of the blog.

Social networking sources may provide a rich trove of psychometric information. For example, the mere presence of an individual on a variety of social networking media may indicate, using MBTI categories as an example, that the person exhibits Extroversion and Feeling tendencies. As another example, an individual who maintains one or more blogs dedicated to a particular technology or comments exclusively on technology-related media may be determined to exhibit a particularly analytical personality type. As a further example, an individual who comments on a variety of topics with great frequency may be determined to exhibit a more critical personality type. Accordingly, for example, psychometric data included in historical team member profiles 302 may include psychometric data 308 determined from social networking sources, e.g., social networking data 108.

In addition to and, sometimes, in combination with the determination of psychometric data from social networking sources, process 12 may further include determining psychometric data through sentiment analysis 110. Sentiment analysis relates generally to the analysis of spoken or written statements in order to identify and extract information regarding the author of the statements. For example, one aspect of sentiment analysis may include classifying the polarity of a phrase (e.g., a phrase from an online comment, a blog entry, or another social networking source), which may indicate whether the phrase expresses a positive, negative or neutral sentiment. For example, a comment that is deeply critical of a news report or that used offensive language toward a previous commenter may be classified as negative, a message via an instant messaging service or Twitter that employs supportive language (e.g., "way to go!" or "this is great!") may be classified as positive, and a blog post regarding the optimal conditions for rainfall in the Amazon may be classified as neutral.

Psychometric data derived from sentiment analysis (e.g., sentiment analysis 110) and included in updated historical project data (e.g., database 204) or available resources (e.g., database 200) may be useful to determining modified project requirements. For example, the psychometric data included in historical team member profiles 302, may include psychometric data determined from sentiment analysis. This sentiment analysis may indicate, for example, that a particular historical team member frequently comments on news stories, blogs or other social networking sources in ways that could be characterized as negative, which may suggest that this particular team member has an analytical perspective. Accordingly, this particular team member may be well suited for quantitative analysis. This sentiment analysis may also suggest, however, that this team member may not be sufficiently supportive of alternative viewpoints to act as a manager of a large or diverse team. Alternatively, sentiment analysis may indicate that a team member is almost universally positive in her participation in social network forums and therefore may be a strong leader of a diverse team.

Figure 5:
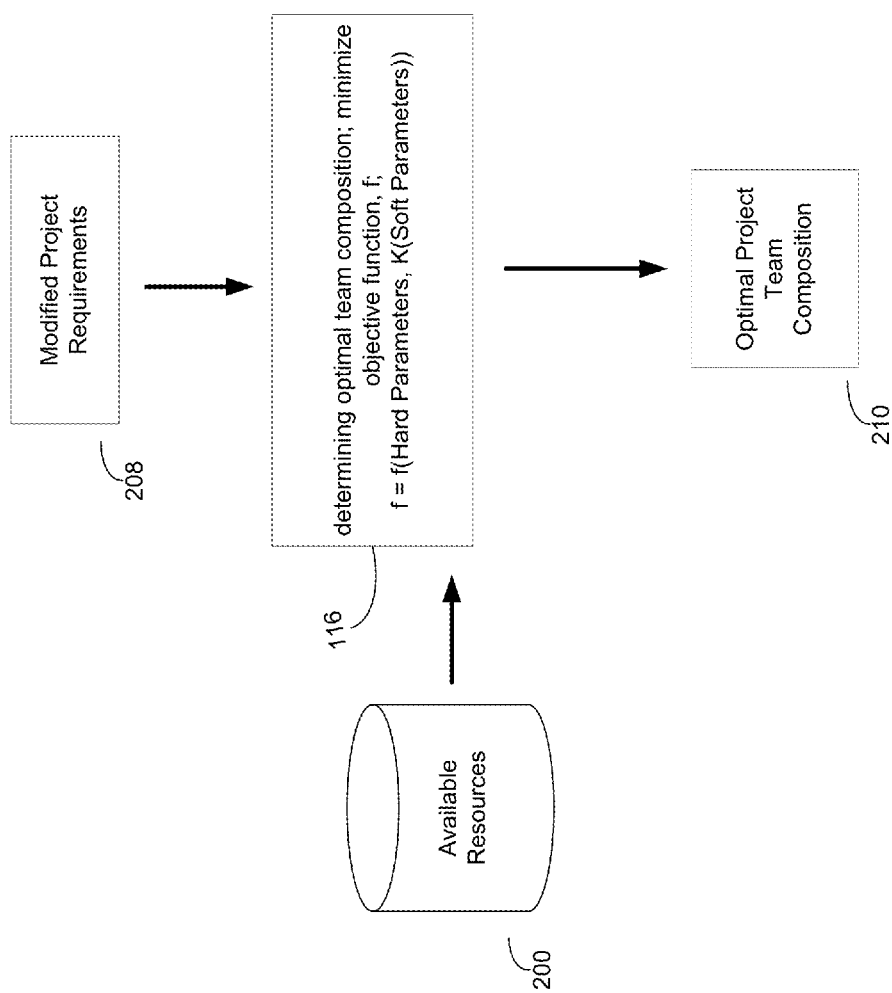
FIG. 5 is a diagrammatic view of a portion of a human resource analytic process.

Referring now also to FIG. 5, process 12 may further include determining 116 an optimal project team composition 210, based upon, at least in part, modified project requirements 208. For example, process 12 may include an objective function f, as is well known in the art, the parameters of which include hard and soft parameters relating to available resources (e.g., those included in database 200) as well as hard and soft parameters relating to modified project requirements 208. Hard parameters relating to available resources may include, for example, the professional or academic qualifications or the geographical location of individuals available to participate in future projects. Hard parameters relating to modified project requirements 208 may include, for example, the necessary professional or academic qualifications or the geographical location of individuals necessary for a new project. Soft parameters relating to available resources (e.g., those included in database 200) may include psychometric data associated with individuals available to participate in future projects. Soft parameters relating to modified project requirements 208 may include psychometric data associated with the desired team composition for a new project, which may be determined, for example, by comparing 112 new project requirements 118 with updated historical project data included, for example, in database 204.

The objective function f may include determining a difference between the hard parameters relating to the available resources and the hard parameters relating to the modified project requirements as well as the difference between the soft parameters relating to the available resources and the soft parameters relating to the modified project requirements. The objective function may further include, for example, a weighting factor K, which may increase or decrease the importance of the soft parameters. The objective function may be minimized by various methods, as is well known in the art, in order to determine 116 an optimal project team composition 210. Optimal project team composition 210 may include a single optimal team composition or may include a ranked or unranked list of various desired or undesired team compositions, as may be useful if not all individuals included as available resources will be able to participate in every project for which they are recommended.

It will be understood that process 12 may, in certain embodiments, be implemented through the use of human assistance. For example, in the case that the updated historical project data (e.g., database 204) is not rich enough (e.g., does not contain enough projects or project clusters to perform meaningful comparison of the updated historical project data with new project requirements 118) a human expert 206 may assist in determining modified project requirements 208. For example, human expert 206 may recognize that a particular new project will need an individual with a particular MBTI profile (e.g., INFP—Introverted, Intuitive, Feeling, Perceiving). However, it may also be true that no historical project included such a team member, and, accordingly, the updated historical project data does not include information relating to such an INFP resource. Accordingly, human expert 206 may supplement modified project requirements 208 with the additional project requirement of including an INFP resource on the project team.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
receiving, via one or more computing devices, historical project data, wherein the historical project data includes at least one profile of at least one historical project team member, one or more historical project requirements, and one or more historical project results;
determining, via the one or more computing devices, psychometric data associated with the at least one historical project team member through sentiment analysis of at least one social networking source, wherein the psychometric data includes psychological characteristics and mental abilities of the at least one historical project team member, wherein sentiment analysis includes computationally identifying and extracting, via the one or more computing devices, at least one of a positive, negative, and neutral sentiment from at least one of a post and a comment from the at least one social networking source, wherein the at least one social networking source includes at least one of a blog, a social networking site, and a social interaction site;
generating, via the one or more computing devices, updated historical project data including, at least in part, adding the psychometric data associated with the at least one historical project team member to the at least one profile included in the historical project data;
receiving, via the one or more computing devices, one or more new project requirements associated with a new project;
identifying, via the one or more computing devices, a similarity between the one or more historical project requirements and the one or more new project requirements, including comparing the psychometric data of the at least one historical project team member to the new project requirements;
identifying, via the one or more computing devices, an indication of success associated with the psychometric data included in the updated historical project data and with the one or more historical project requirements identified as similar to the one or more new project requirements;
determining, via the one or more computing devices, a set of modified project requirements for the new project based upon, at least in part, identifying the indication of success and the psychometric data associated with the at least one historical project team member determined through sentiment analysis; and
determining a ranked list of various possible team compositions that are optimal for the one or more new project requirements based upon, at least in part, the psychometric data associated with the at least one historical project team member determined through sentiment analysis.

2. The method of claim 1 further comprising:
creating at least one data cluster including, at least in part, one or more portions of at least one of the historical project data and the updated historical project data.

3. The method of claim 1 further comprising:
determining the ranked list of various possible team compositions, based upon, at least in part, the modified project requirements.

4. A method comprising:
identifying, via one or more computing devices, a similarity between one or more historical project requirements associated with one or more historical projects and one or more new project requirements associated with a new project;
determining, via one or more computing devices, historical psychometric data associated with one or more historical team members associated with the one or more historical projects through sentiment analysis of at least one social networking source, wherein the historical psychometric data includes psychological characteristics and mental abilities of the one or more historical team members, wherein sentiment analysis includes computationally identifying and extracting, via the one or more computing devices, at least one of a positive, negative, and neutral sentiment from at least one of a post and a comment from the at least one social networking source, wherein the historical psychometric data associated with one or more historical team member is, at least in part, determined from at least one social networking source including at least one of a blog, a social networking site, and a social interaction site;
identifying, via one or more computing devices, an indication of success associated with the historical psychometric data and with the one or more historical project requirements identified as similar to the one or more new project requirements based upon, at least in part, a comparison between the historical psychometric data associated with the one or more historical team members and the one or more new project requirements;
determining, via one or more computing devices, one or more modified project requirements for the new project based upon, at least in part, identifying the indication of success and the psychometric data associated with the at least one historical project team member determined through sentiment analysis; and
wherein the one or more modified project requirements for the new project includes, at least in part, one or more team composition recommendations, and wherein the one or more team composition recommendations includes, at least in part, a ranked list of various possible team compositions that are optimal for the one or more new project requirements based upon, at least in part, the psychometric data associated with the at least one historical project team member determined through sentiment analysis.

5. The method of claim 4 wherein the updated historical project data includes at least one data cluster.

* * * * *